United States Patent
Hickey

(10) Patent No.: US 7,927,513 B1
(45) Date of Patent: Apr. 19, 2011

(54) METHOD OF TREATING A HOT SYNGAS STREAM FOR CONVERSION TO CHEMICAL PRODUCTS BY REMOVING AMMONIA AND COS

(75) Inventor: Robert Hickey, Okemos, MI (US)

(73) Assignee: Coskata, Inc., Warrenville, IL (US)

( * ) Notice: Subject to any disclaimer, the term of this patent is extended or adjusted under 35 U.S.C. 154(b) by 0 days.

(21) Appl. No.: 12/606,469

(22) Filed: Oct. 27, 2009

(51) Int. Cl.
*C10K 1/08* (2006.01)
(52) U.S. Cl. ... 252/373; 423/237; 423/238; 423/243.01; 423/215.5; 423/236; 210/601; 210/620
(58) Field of Classification Search ........... 252/373; 423/237, 238, 243.01, 215.5, 236; 210/601, 210/620
See application file for complete search history.

(56) References Cited

U.S. PATENT DOCUMENTS

| | | | |
|---|---|---|---|
| 4,189,307 A * | 2/1980 | Marion | 48/197 R |
| 6,136,577 A | 10/2000 | Gaddy | |
| 6,340,581 B1 | 1/2002 | Gaddy | |
| 6,998,098 B2 * | 2/2006 | Allison | 423/210 |
| 7,285,402 B2 | 10/2007 | Gaddy et al. | |
| 2008/0305540 A1 | 12/2008 | Hickey et al. | |
| 2009/0215139 A1 | 8/2009 | Datta et al. | |
| 2009/0215163 A1 | 8/2009 | Tsai et al. | |

FOREIGN PATENT DOCUMENTS

WO   WO2008154301   12/2008

OTHER PUBLICATIONS

Clausen, E.C., et al., "Ethanol From Biomass by Gasification/Fermentation", Presented at Plastics, Tires, Auto Wastes/Biomass MSW Symposium, Fall 1993, Chicago, 38 (3).
Klasson, K.T., et al., "Biological Production of Liquid and Gaseous Fuels from Synthesis Gas," Appl. Biochem. Biotechnol., vol. 24-25, No. 1, Mar. 1990, 857-873.
Vega, J. L., et al., "The Biological Production of Ethanol from Synthesis Gas," Appl. Biochem. Biotechnol. vol. 20-21, No. 1, Jan. 1989, 781-797.
Phillips, John R., et al., "Synthesis Gas as Substrate for the Biological Production of Fuels and Chemicals," Appl. Biochem. Biotechnol. vol. 45-46, No. 1, Mar. 1994, 145-157.
Barik, S., et al., "Biological Production of Alcohols from Coal Through Indirect Liquefaction," Appl. Biochem. Biotechnol. vol. 18, No. 1, Aug. 1988, 363-387.

* cited by examiner

Primary Examiner — Timothy C Vanoy

(57) ABSTRACT

A method for the high removal of ammonia, COS and HCN from syngas (along with some polishing of particulates) in a cost effective and environmentally benign and sustainable fashion, with the need for little to no chemical addition by using a combination of water based gas scrubbing, HCN scrubbing and biological processing steps.

27 Claims, 3 Drawing Sheets

METHOD OF TREATING A HOT SYNGAS STREAM FOR CONVERSION TO CHEMICAL PRODUCTS BY REMOVING AMMONIA AND COS

FIELD OF THE INVENTION

This invention relates to methods for removing ammonia, COS and HCN from syngas in an environmentally benign and sustainable fashion using a combination of water based gas scrubbing and biological processing steps and in certain cases HCN scrubbing.

BACKGROUND

Biofuels production for use as liquid motor fuels or for blending with conventional gasoline or diesel motor fuels is increasing worldwide. Such biofuels include, for example, ethanol and n-butanol. One of the major drivers for biofuels is their derivation from renewable resources by fermentation and bioprocess technology. Conventionally, biofuels are made from readily fermentable carbohydrates such as sugars and starches. For example, the two primary agricultural crops that are used for conventional bioethanol production are sugarcane (Brazil and other tropical countries) and corn or maize (U.S. and other temperate countries). The availability of agricultural feedstocks that provide readily fermentable carbohydrates is limited because of competition with food and feed production, arable land usage, water availability, and other factors. Consequently, lignocellulosic feedstocks such as forest residues, trees from plantations, straws, grasses and other agricultural residues may become viable feedstocks for biofuel production. However, the very heterogeneous nature of lignocellulosic materials that enables them to provide the mechanical support structure of the plants and trees makes them inherently recalcitrant to bioconversion.

One available technology path to convert lignocellulose biomass to ethanol is to convert lignocellulosic biomass to syngas (also known as synthesis gas, primarily a mix of CO, $H_2$ and $CO_2$ with other components such as $CH_4$, $N_2$, $NH_3$, $H_2S$ and other trace gases) in a gasifier and then ferment this gas with anaerobic microorganisms to produce biofuels such as ethanol, n-butanol or chemicals such as acetic acid, butyric acid and the like. This technology path can convert all of the components to syngas with good efficiency (e.g., greater than 75%), and some strains of anaerobic microorganisms can convert syngas to ethanol, n-butanol or other chemicals with high (e.g., greater than 90% of theoretical) efficiency. Moreover, syngas can be made from many other carbonaceous feedstocks such as natural gas, reformed gas, peat, petroleum coke, coal, solid waste and land fill gas, making this a more universal technology path.

However, production of syngas from biomass results in the generation of ammonia, carbonyl sulfide (COS) and hydrogen cyanide (HCN) as contaminants that are detrimental to both chemical and biological conversion of the syngas to useful chemicals. These contaminants must be removed from syngas and then managed or destroyed in an environmentally acceptable manner, generally at significant expense.

Conventional methods for removal of ammonia, COS and HCN from syngas prior to its use generally involves scrubbing with aqueous solutions to remove these compounds from the syngas with subsequent discharge of the scrubbing solutions to wastewater treatment or via alternate disposal methods.

Modern processes for ammonia removal include the water wash process in which the gas is scrubbed by water, which dissolves the ammonia. The resulting scrubbing solution is pumped to an ammonia still where steam is used to strip out the ammonia. The ammonia vapors from the still can be processed to form ammonium sulfate, condensed to form a strong ammonia solution, incinerated or catalytically converted to nitrogen and hydrogen which are then recycled back into the gasifier.

Another process for ammonia removal from coke oven gas is the PHOSAM process developed by US Steel. This process absorbs the ammonia from the gas stream using a solution of monoammonium phosphate. The process produces saleable anhydrous ammonia, but operates at temperatures on the order of 50 degrees Celsius and pressures up to 190 psig (~13 atmospheres of pressure gauge) in the stripper column. There is a need for a more robust and cost effective method for the treatment of syngas, particularly when used for biological transformation to useful liquid products such as ethanol, acetic acid or butanol.

Well known and used biological treatment processes, used in concert with water based scrubbers can meet the objectives of high removal of ammonia, COS and HCN from syngas. Biological treatment processes can operate at atmospheric pressure and low temperatures without the excessive cost of expensive chemicals and operate without the generation of hazardous and/or toxic wastes. Biological treatment processing of ammonium, COS, and HCN absorbed into water from gas streams has been done before. Ammonia is, in general, removed using a slightly acidic or neutral pH scrubbing solution and this spent solution is sent to an aerobic wastewater treatment system where the ammonia is oxidized to nitrate and the nitrate subsequently reduced to nitrogen gas via denitrification, generally using an added organic electron donor such as methanol.

SUMMARY OF THE INVENTION

In the instant invention, the objectives of high removal of ammonia, COS and HCN from syngas and their subsequent destruction in a cost effective, environmentally sustainable fashion is achieved by taking advantage of the fact that, during biological fermentation of syngas to ethanol and/or other soluble products, some water must be purged from the system to assist in the wasting of excess cellular biomass, as well as to prevent the build up of secondary metabolites and dissolved solids. For the case of converting syngas to ethanol, acetic acid/acetate is present in the purged water. The acetic acid/acetate provides control of the pH in the scrubber used to capture ammonia (and COS) and the acetate can then be used as the electron donor for the conversion of nitrate formed via biological oxidation of the absorbed ammonia to $N_2$ gas.

Thus, the instant invention involves a multi-step process in which a biological treatment zone is used in concert with water based scrubbers and can include HCN scrubbers for the high removal of ammonia, COS and HCN from syngas and their subsequent destruction in a cost effective, environmentally sustainable fashion.

In the instant invention, after a preliminary step for removal of particulates in the syngas via a separator or similar device, the ammonia gas and COS and remaining particulates in the syngas stream are captured in a scrubber. This operation concurrently cools the syngas and results in considerable condensation of water vapor from the syngas into the scrubbing solution. The scrubbing solution added to the scrubber is the purge water from a fermentation process and/or still bottoms that is acidic due to the presence of an acid, acetic acid in the case of ethanol production, in the water. This is sufficient to keep the pH in the scrubber low enough so that a high efficiency for ammonia removal can be achieved. COS is extremely soluble in water and is captured in the scrubber as well.

The ammonia rich solution is then sent to a two stage anoxic-aerobic biological treatment zone. The effluent from the biological treatment zone may be used as the working fluid in a HCN scrubbing tower used to remove on the order of 98% of the HCN from the syngas. The effluent from the HCN scrubber can be recycled or processed in the same anoxic-aerobic treatment zone. Moreover, the effluent from the biological treatment zone may be internally recycled and processed back into the anoxic-aerobic treatment zone.

By using the proper amount of recycle flow from the biological treatment zone effluent to the HCN scrubber, high efficiency of HCN removal can be achieved and the sequential anoxic-aerobic treatment steps result in high removal of the ammonium and the resultant nitrate produced from oxidation of the ammonium (via reduction in the anoxic stage of the biological process). Removal of the COS and HCN is also achieved in the anoxic step which eliminates inhibition or toxicity that these compounds can cause on nitrification (biological ammonium oxidation). Alkalinity produced via the absorption and dissociation of the ammonia to ammonium in the scrubber water combined with the additional alkalinity produced during reduction of the nitrate to N2 gas, using the acetate/acetic acid in the anoxic biological treatment step provides sufficient alkalinity after the anoxic biological treatment step to buffer the water during the ammonium oxidation or nitrification step with little to no requirement for an external source of alkalinity (such as caustic). Thus the process arrangement comprises a biological treatment processor used in concert with a water based scrubber and if desired an HCN scrubber for the high removal of ammonia, COS and HCN from syngas. The purge flow from the fermentation process supplies acetic acid to the scrubber. This helps maintain the appropriate pH range in the scrubber water while eliminating the need for adding acid to achieve this, thus saving on cost.

After particulate removal, at least a portion of the scrubber waste water effluent is sent to the first step in the biological treatment zone, the anoxic biological treatment step, for the partial conversion of nitrate formed from ammonia, and ammonium into nitrogen gas and for the at least partial conversion of COS to primarily CO2 and H2S to produce an anoxic effluent stream.

Additionally, at least a portion of the treated syngas stream effluent from the scrubber which contains HCN may pass to an HCN scrubber for contact with a HCN scrubbing water stream for HCN removal. In which case an HCN scrubbing water effluent is withdrawn from the HCN scrubber and at least a portion of the HCN scrubbing water effluent is blended with the scrubber waste water effluent in the anoxic biological treatment step.

Additionally it is possible to add a chemical to the scrubber water in the venturi type scrubber that reacts with or otherwise sequesters HCN allowing for a high capture efficiency in the scrubber. The HCN or product(s) formed from the reaction of the added chemical and the HCN are then removed in the downstream particulate removal or anoxic-aerobic biological processing steps. For example, formaldehyde may be added which would react with the HCN for form a glycolonitrile that may be subsequently treated in the anoxic-aerobic biological treatment stage.

The acetate/acetic acid added via the purge water in the scrubber waste water effluent is used as both the electron donor to reduce the nitrate to N2 gas and as the source of carbon for cellular growth of microorganisms. This eliminates the need and cost of adding an external source for an electron donor and carbon source. Both COS and HCN are concurrently degraded in the anoxic biological treatment step, as well. The HCN is converted to compounds that are benign to microorganisms in the second step of the biological treatment zone, the aerobic biological treatment step. The degradation of COS and HCN is important in that these compounds have the ability to inhibit the nitrification process if present at certain concentration levels. At least a portion of the anoxic effluent stream passes to the aerobic biological treatment step for the nitrification of ammonium to nitrates. Afterwards, the biologically treated waste water stream is withdrawn from the aerobic biological treatment step. A portion of the biologically treated waste water stream is internally recycled back into the anoxic biological treatment step and when HCN scrubbing is provided another portion of the biologically treated waste water stream is recycled into the HCN scrubber for contact with the HCN scrubbing water stream. The biologically treated waste water contains nitrate that is removed from the stream as it is recycled through the HCN scrubber and back into the anoxic biological treatment step in the process. The amount of biologically treated waste water internally recycled from the aerobic biological treatment step to the anoxic biological treatment step is adjusted to maintain a predetermined effluent nitrate concentration The reaction of nitrate reduction to N2 gas in the anoxic biological treatment step produces approximately 3.57 mg alkalinity per mg of nitrate-N reduced. This is the same as is produced by the absorption and dissociation of ammonia into water as ammonium (3.57 mg alkalinity per mg. NH3-N absorbed). When the anoxic effluent stream passes on to the aerobic biological treatment step this alkalinity along with the alkalinity from ammonia absorption maintains the pH in the range needed for the subsequent oxidation of the ammonium to nitrate which consumes approximately 7.14 mg alkalinity per mg of NH4-N oxidized to NO3-N. Oxidation of any of any residual organics from the anoxic biological treatment step also occurs in the aerobic biological treatment step.

By controlling the flow of the biologically treated waste water that is either internally recycled back to the anoxic biological treatment step from the aerobic biological treatment step or routed through an HCN scrubber the concentration of nitrate in the final biological treated waste water effluent may be controlled. Additionally, the internal recycle loop of recycling the biologically treated waste water stream directly into the anoxic biological treatment step allows the recycle rate to be decoupled from what is needed for scrubbing HCN and, therefore, better process control of the final biological treated waste water effluent quality is achieved. If extremely stringent nitrate discharge levels have to be met, a small polishing anoxic biological treatment step may be added prior to discharge.

The result is high removal of ammonia, COS and optionally HCN from the syngas (along with some polishing of particulates) in a cost effective and environmentally benign and sustainable fashion, with the need for little to no chemical addition.

DESCRIPTION OF THE PREFERRED EMBODIMENT(S)

Figure 1:
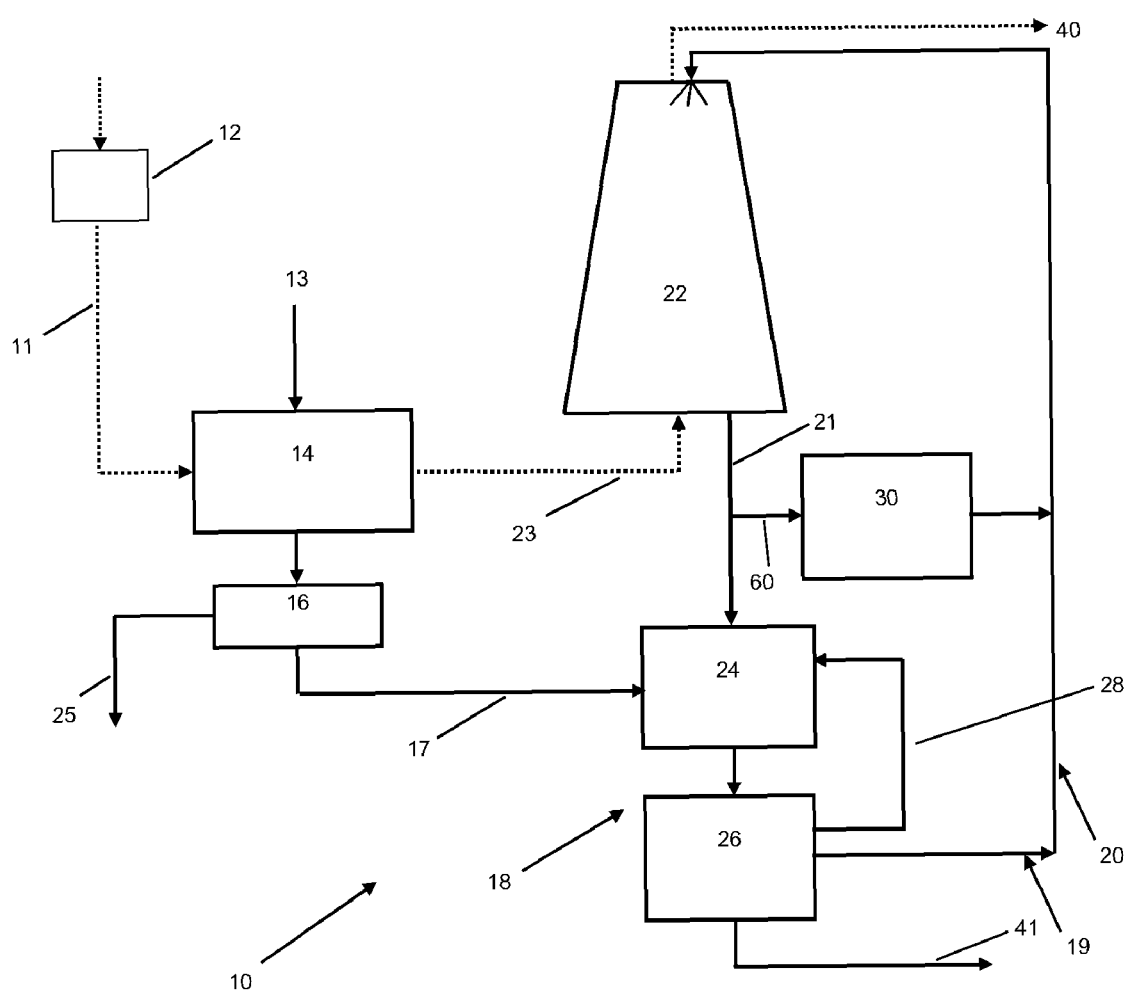
FIG. 1 is a block diagram showing the steps of a first embodiment of the subject method as carried out by a syngas conversion system run according to the method.

Bioconversions of CO and H2/CO2 to acetic acid, ethanol and other products are well known. For example, in a recent book concise description of biochemical pathways and energetics of such bioconversions have been summarized by Das, A. and L. G. Ljungdahl, Electron Transport System in Acetogens and by Drake, H. L. and K. Kusel, Diverse Physiologic Potential of Acetogens, appearing respectively as Chapters 14 and 13 of Biochemistry and Physiology of Anaerobic Bacteria, L. G. Ljungdahl eds., Springer (2003). Any suitable microorganisms that have the ability to convert the syngas components: CO, H2, CO2 individually or in combination with each other or with other components that are typically present in syngas may be utilized. Suitable microorganisms and/or growth conditions may include those disclosed in U.S. patent application Ser. No. 11/441,392, filed May 25, 2006, entitled "Indirect or Direct Fermentation of Biomass to Fuel Alcohol," which discloses a biologically pure culture of the microorganism *Clostridium Carboxidivorans* having all of the identifying characteristics of ATCC no. BAA-624; and U.S. Pat. No. 7,704,723 which discloses a biologically pure culture of the microorganism *Clostridium Ragsdalei* having all of the identifying characteristics of ATCC No. BAA-622; both of which are incorporated herein by reference in their entirety. *Clostridium Carboxidivorans* may be use, for example, to ferment syngas to ethanol and/or n-butanol. *Clostridium Ragsalei* may be used, for example, to ferment syngas to ethanol.

Suitable microorganisms and growth conditions include the anaerobic bacteria *Butyrubacterium Methylotrphicum*, having the identifying characteristics of ATCC 33266 which can be adapted to CO and used and this will enable the production of n-butanol as well as butyric acid as taught in the references: "Evidence for Production of n-Butanol from Carbon Monoxide by *Butyribacterium Methylotrophicum*," Journal of Fermentation and Bioengineering, vol. 72, 1991, p. 58-60; "Production of butanol and ethanol from synthesis gas via fermentation," FUEL, vol. 70, May 1991, p. 615-619. Other suitable microorganisms include *Clostridium Ljungdahli*, with strains having the identifying characteristics of ATCC 49587 (U.S. Pat. No. 5,173,429) and ATCC 55988 and 55989 (U.S. Pat. No. 6,136,577) and this will enable the production of ethanol as well as acetic acid. All of these references are incorporated herein in their entirety. Production of syngas from biomass results in the generation of ammonia, carbon sulfide (COS) and hydrogen cyanide (HCN) as contaminants that are detrimental to both chemical and biological conversion of the syngas to useful chemicals such as ethanol. These contaminants must be removed from syngas and then managed or destroyed in an environmentally acceptable manner. The instant invention involves a multi-step process in which a biological treatment processor is used in concert with water based scrubbers and optionally HCN scrubbers for the high removal of ammonia, COS and HCN from syngas and their subsequent destruction in a cost effective, environmentally sustainable fashion.

This invention can be used with any stream that contains a suitable concentration of syngas components. Suitable streams will preferably contain a minimum of 10 wt. % CO and/or H2. The system will normally operate under anaerobic conditions.

Well known and used biological treatment processes, used in concert with water based scrubbers can meet the objectives of high level removal of ammonia, COS and HCN from syngas and their subsequent destruction or ancillary use in a cost effective, environmentally sustainable fashion. Such may be achieved by taking advantage of the fact that, during biological fermentation of syngas to ethanol and other soluble products, some water must be purged from the conversion system to assist in the wasting of excess cellular biomass, as well as to prevent the build up of secondary metabolites and dissolved solids.

For the case of conversion of syngas to ethanol, acetic acid/acetate is present in the purged water. The existence of acetic acid/acetate in the purged water provides two things: control of pH in the scrubber used to capture ammonia (and COS) and; acetate for use as the electron donor for the conversion of nitrate formed via biological oxidation of the absorbed ammonia to N2 gas.

In the instant invention, in one suitable system 10, as shown in FIG. 1, a stream of hot syngas 11, after a preliminary step for removal of particulates in the syngas via a cyclone separator or similar device at 12, is sent to a venturi type scrubber 14 where the ammonia gas and COS and remaining particulates in the syngas stream are captured. This operation concurrently cools the syngas and results in considerable condensation of water vapor from the syngas into the scrubbing solution. The scrubbing solution added to the scrubber 14 is the purge water 13 from fermentation and/or still bottoms that is acidic due to the acetic acid in the water. This acidity keeps the pH in the venturi scrubber 14 low enough to achieve a high efficiency for ammonia removal. COS is extremely soluble in water and is captured to a high degree here as well. The invention normally maintains the scrubbing solution at a pH of at least one pH unit less than and preferably closer to two pH units below the pH of ammonia which is 8.95. Thus, the preferred pH of the circulating scrubber water should be maintained at a pH of less than 8.0, preferably less than 7.5. Adding the purge water from the fermentation process and/or still bottoms, which contains acetic acid, to the circulating scrubber water in the scrubber 14 readily provides the desired pH.

Further particulates in the scrubber solution are removed at separator 16 and the ammonia rich solution is then sent via a line 17 to a two stage anoxic-aerobic biological treatment system 18 having an anoxic treatment step 24 and an aerobic treatment step 26. The effluent from this biological treatment system is then sent via a line 19 as the working fluid in a scrubbing tower 20 to remove at least 90% and more preferably over 98% of the HCN from the syngas. The effluent from the HCN scrubber 22 is removed via line 21 and recycled via a line 60 or processed in the same anoxic-aerobic treatment system.

By using the proper amount of recycle flow from the biological treatment system effluent to the HCN scrubber 22, via line 19, high efficiency of removal is achieved and the sequential anoxic aerobic treatment steps result in high removal of the ammonium and the resultant nitrate produced from oxidation of the ammonium (via reduction in the anoxic stage of the biological process); removal of the COS and HCN is also achieved in the anoxic step which eliminates inhibition or toxicity these compounds can cause on nitrification (biological ammonium oxidation) in the subsequent aerobic step.

Alkalinity is produced via the absorption and dissociation of the ammonia to ammonium in the venturi type scrubber 14 water and additional alkalinity produced during reduction of the nitrate to N2, using the acetate/acetic acid in the anoxic treatment step 18 is such that there is sufficient alkalinity present after the anoxic step to buffer the water during the ammonium oxidation or nitrification step. As a result little to no external source of alkalinity (such as caustic) is, required.

In this process, described in general terms above, the syngas is pretreated upstream of line 11 to remove the bulk of the particulates in a cyclone or similar device. Sending the pretreated syngas stream to a venturi type scrubber at 14 followed by particulate scrubbing at 16 removes the solids for disposal at 25 while also providing absorption of the ammonia and COS. Thus, particulates captured from the syngas are removed from the water stream after the venturi 14 at 16 but before the flow is sent on to the biological treatment step 18.

After particulate removal, the total liquid flow is sent via line 17 to the first step in the biological processing system 18, the anoxic reactor 24. Here it is blended with flow taken by line 21 from the HCN scrubber 22 (which contains nitrate formed in the aerobic/nitrification step along with HCN captured in the scrubber). The acetate/acetic acid added via the purge water is used as both the electron donor to reduce the nitrate to N2 and the source of carbon for cell growth in the anoxic step. This eliminates the need and cost of adding an external source for providing these. Both COS and HCN are concurrently transformed and/or degraded in the anoxic stage. This is important in that these compounds have the ability to inhibit the nitrification process if present at certain concentration levels.

The reaction of nitrate reduction to nitrogen gas (N2) produces approximately 3.57 mg alkalinity per mg of nitrate-N reduced. This same as is produced by the absorption and dissociation of ammonia into water as ammonium (3.57 mg alkalinity per mg NH3-N absorbed). The flow is then passed onto the aerobic step 26 where this alkalinity removed. Oxidation of any of any residual organics from the anoxic step also occurs in the aerobic reactor 26. A portion of the effluent from the aerobic reactor 26 has nitrate that is removed from the water as it is recycled through the HCN scrubber 22 and back to the anoxic step 24 in the process with another portion removed from the system 10 at 41.

By apportioning the liquid flow that is recycled back to the anoxic step from the aerobic step, either by routing through the HCN scrubber 22 via line 19 or directly back from the aerobic stage via line 28, the concentration of nitrate in the final effluent can be controlled. This allows the recycle rate to be decoupled from what is needed for scrubbing HCN at scrubber 22 and, therefore, better process control of the final effluent quality. If extremely stringent nitrate discharge levels have to meet, a small polishing anoxic step (not shown) can be added prior to discharge.

A portion of the scrubber effluent may be directed to a separate HCN removal system 30. System 30 can comprise any system for removal of HCN where HCN is either destroyed (via biological or chemical means), removed from aqueous solution (via adsorption with GAC), or stripped from solution and managed elsewhere (such as the catalytic oxidizer, vapor phase GAC or other). Since the HCN is present as primarily a dissolved gas at pH of 8.0 or less, stripping and treatment may be quite efficient and cost effective. Finally, the syngas processed by this method is sent to fermentation via a line 40.

Figure 2:
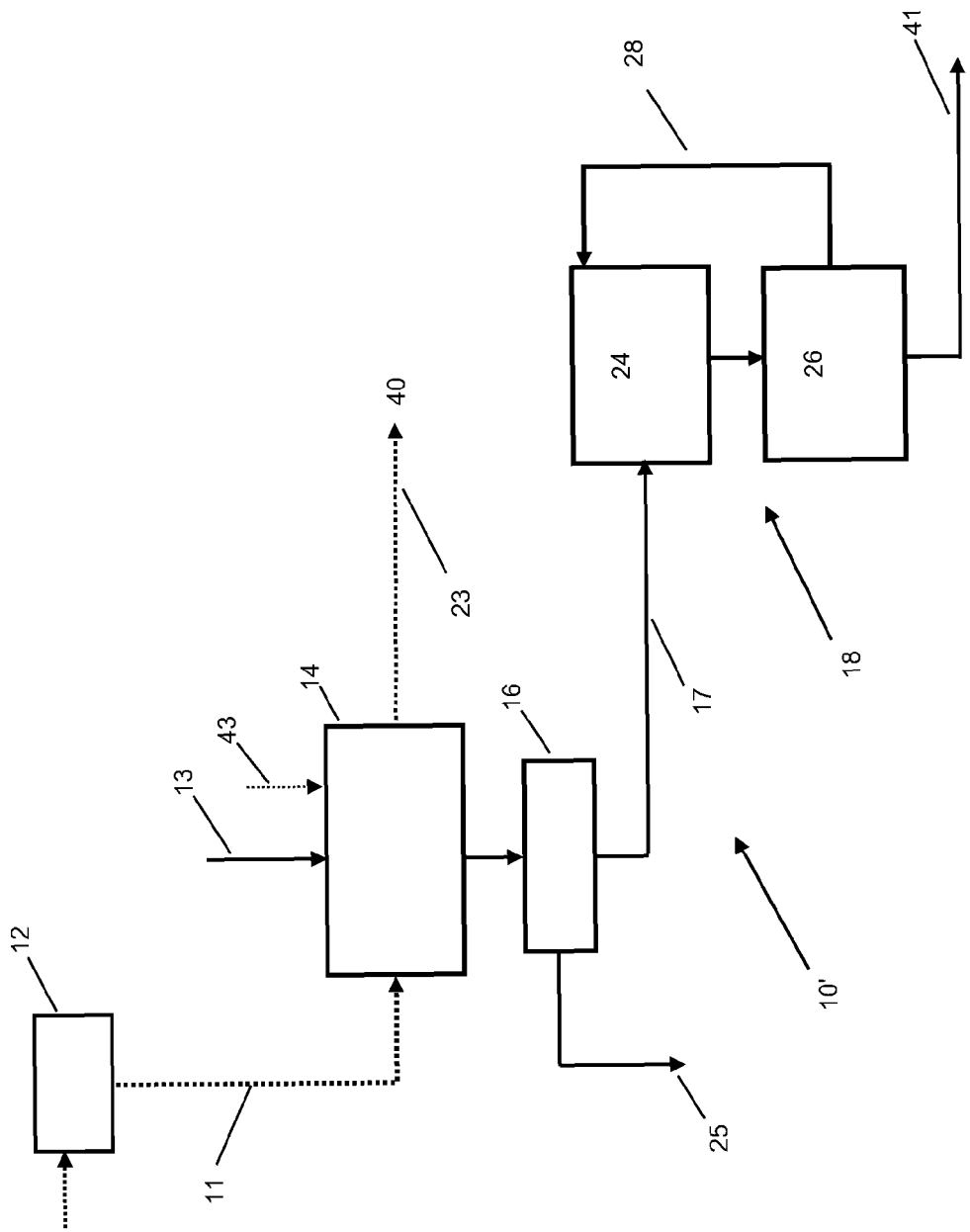
FIG. 2 is a block diagram showing the steps of a second embodiment of the subject method as carried out by a syngas conversion system run according to the method.

FIG. 2 shows a variation in the arrangement of this invention in a process arrangement 10' which is substantially identical to an upstream section of FIG. 1 and represents an arrangement of the invention that has been found to be efficient where extensive HCN scrubbing and removal are not required, a scrubber section 20 is not integrated into the process, or a chemical is added to the scrubber water that reacts with or sequesters the HCN in a form or compound that is readily removed in the downstream particulate removal or anoxic-aerobic biological treatment steps. Like items in FIG. 1 are like numbered in FIG. 2. In the arrangement of FIG. 2 the cooled syngas is sent directly to fermentation from the scrubber 14 or where necessary to a hydrogen sulfide scrubber. Where desired a line 43 may add a chemical to scrubber 14 that reacts with or sequesters HCN for its removal downstream in separator 16 or anoxic-aerobic biological treatment system 18. Further particulates in the scrubber solution are removed at separator 16 and the ammonia rich solution is then sent via a line 17 to a two stage anoxic-aerobic biological treatment system 18 having an anoxic treatment step 24 and an aerobic treatment step 26. The sequential anoxic aerobic treatment steps result in high removal of the ammonium and the resultant nitrate produced from oxidation of the ammonium (via reduction in the anoxic stage of the biological process); removal of the COS and HCN is also achieved in the anoxic step which again eliminates inhibition or toxicity these compounds can cause on nitrification (biological ammonium oxidation) in the subsequent aerobic step.

As described previously alkalinity produced via the absorption and dissociation of the ammonia to ammonium in the venturi type scrubber 14 water and additional alkalinity produced during reduction of the nitrate to N2, using the acetate/acetic acid in the anoxic treatment step 18 is such that there is sufficient alkalinity present after the anoxic step to buffer the water during the ammonium oxidation or nitrification step. As a result little to no external source of alkalinity (such as caustic) is, required.

The process of FIG. 2 operates in the same manner where the syngas is pretreated upstream of line 11 to remove the bulk of the particulates in a cyclone or similar device and the venturi type scrubber at 14 followed by particulate scrubbing at 16 removes the solids for disposal at 25 while also providing absorption of the ammonia and COS.

After particulate removal, the total liquid flow is sent via line 17 to the first step in the biological processing system 18, the anoxic reactor 24. Both COS and HCN if present are concurrently degraded in the anoxic stage.

The flow is again passed onto the aerobic step 26 where alkalinity is removed and oxidation of any of any residual organics from the anoxic step also occurs. The portion of the effluent from the aerobic reactor 26 has nitrate that is removed from the water as it is recycled back to the anoxic step 24 in the process with another portion removed from the system 10' at 41.

Figure 3:
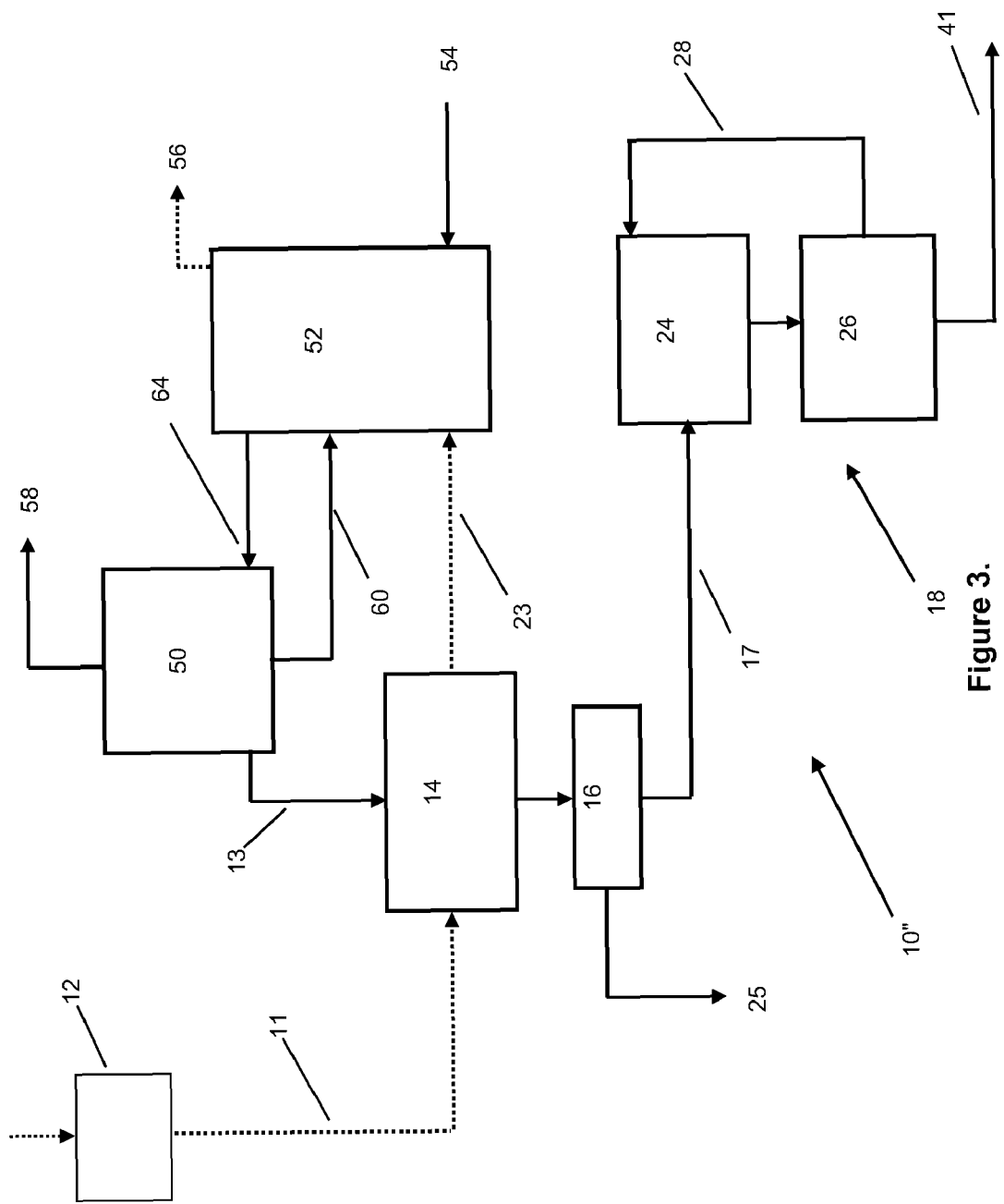
FIG. 3 is a block diagram showing the steps of a third embodiment of the subject method as carried out by a syngas conversion system run according to the method.

Finally, the syngas processed by this method is sent to fermentation via a line 40 and is more fully described in the description of FIG. 3.

In FIG. 3 the downstream processing of fermentation has been added to the disclosure of FIG. 2 in a process arrangement 10". Like items are again numbered alike. A distillation system or still 50 supplies purge water via a line 13 to the scrubber 14. Cleaned and cooled syngas taken by line 23 from the scrubber 14 is fed to a fermenter 52 for producing acetate and ethanol therefrom. Nutrient feed and process water are supplied thereto via line 54. Fermentation effluent from the fermenter 52 is fed to the distillation system 50 via line 64 and off gas from fermentation is removed therefrom via line 56. Ethanol from the distillation system 50 is removed for final processing via line 58 while the bottoms 60 therefrom are fed to the fermenter 52.

As described above the method of the present invention provides a number of advantages, some of which have been described above and others of which are inherent in the invention. Also modifications may be proposed without departing from the teachings herein. Accordingly the scope of the invention is only to be limited as necessitated by the accompanying claims.

The invention claimed is:

1. A method of treating a hot syngas stream for conversion to chemical products by removing particulates, ammonia and COS from the hot syngas stream comprising the steps of:
   passing the hot syngas stream to a scrubber;
   adding an acidic solution comprising a purge water to a circulating scrubber water;
   capturing ammonia, COS and particulates in the circulating scrubber water and condensing water from the hot syngas stream into the circulating scrubber water;
   withdrawing a scrubber waste water effluent from the scrubber comprising absorbed COS, ammonia and particulates from the scrubber;
   withdrawing a treated syngas stream effluent from the scrubber having a reduced concentration of COS, ammonia and particulates; and,
   converting the treated syngas stream to chemical products in a process that produces at least a portion of the purge water.

2. The method of claim 1 wherein the circulating scrubber water is maintained at a pH of less than 8.0.

3. The method of claim 1 wherein the circulating scrubber water is maintained at a pH of less than 7.5.

4. The method of claim 1 wherein the hot syngas stream passes to a separator for the removal of most of the particulates before passing to the scrubber.

5. The method of claim 1 wherein the process for converting the treated hot syngas stream to chemical products is a fermentation process and the purge water comprises acetic acid and water.

6. The method of claim 1 wherein the acidic solution comprises acetic acid and the acidic solution is added to the circulating scrubber water in sufficient amounts to increase the scrubber efficiency by reducing the pH in the scrubber by a sufficient amount to capture the ammonia gas.

7. The method of claim 1 wherein at least a portion of the scrubber waste water effluent stream enters a biological treatment zone for the removal of COS and ammonia.

8. The method of claim 7 wherein the hot syngas stream contains HCN and at least a portion of the treated syngas stream effluent from the scrubber is sent to a HCN scrubber and at least a portion of a HCN scrubbing water effluent is sent to the anoxic biological treatment step for the removal of HCN.

9. The method of claim 1 wherein at least a portion of the scrubber waste water effluent stream undergoes an anoxic biological treatment step to produce an anoxic effluent stream; at least a portion of the anoxic effluent stream undergoes an aerobic biological treatment step; a biologically treated waste water stream is recovered from the aerobic biological treatment step; and a portion of the biologically treated waste water stream is recycled back to the anoxic biological treatment step.

10. The method of claim 9 wherein the amount of biologically treated waste water recycled from the aerobic biological treatment step to the anoxic biological treatment treatment step is adjusted to maintain a predetermined effluent nitrate concentration and the anoxic biological treatment step is maintained at a pH range of from 6.0 to 9.0.

11. The method of claim 1 wherein the process that produces at least a portion of the purge water comprises a fermentation process, at least a portion of the treated syngas stream effluent from the scrubber enters a fermentation zone of the fermentation process that converts the treated syngas to soluble chemical products by contact with anaerobic microorganisms in an aqueous fermentation broth, and the acidic solution comprises a portion of the aqueous fermentation broth.

12. A method of treating a hot syngas stream for conversion to chemical products by removing particulates, ammonia and COS from the hot syngas stream comprising the steps of:
   passing the hot syngas stream to a scrubber;
   adding an acidic solution to a circulating scrubber water;
   capturing ammonia, COS and particulates in the circulating scrubber water and condensing water from the hot syngas stream into the circulating scrubber water;
   withdrawing a scrubber waste water effluent from the scrubber comprising absorbed COS, ammonia, ammonium and particulates from the scrubber;
   withdrawing a treated syngas stream effluent from the scrubber having a reduced concentration of COS, ammonia and particulates; and,
   passing at least a portion of the scrubber waste water effluent stream to a biological treatment zone for the removal of ammonia and absorbed COS to produce a biologically treated waste water effluent.

13. The method of claim 12 wherein the acidic solution comprises purge water from a process for converting the treated hot syngas stream to chemical products and the addition of purge water is controlled to maintain the circulating scrubber water in a pH range of less than 8.0.

14. The method of claim 12 wherein the acidic solution comprises purge water from a process for converting the treated hot syngas stream to chemical products and the addition of purge water is controlled to maintain the circulating scrubber water in a pH range of less than 7.5.

15. The method of claim 12 wherein the process for converting the treated hot syngas stream to chemical products is a fermentation process and the purge water comprises acetic acid and water.

16. The method of claim 12 wherein at least a portion of the scrubber waste water effluent stream passes to an anoxic biological treatment step in the biological treatment zone for the partial conversion of nitrate formed from ammonia, and ammonium into nitrogen gas and for the at least partial conversion of COS to primarily CO2 and H2S to produce an anoxic effluent stream; at least a portion of the anoxic effluent stream passes to an aerobic biological treatment step in the biological treatment zone for the nitrification of ammonium to nitrates; the biologically treated waste water stream is recovered from the aerobic biological treatment step; and a portion of the biologically treated waste water stream is recycled back to the anoxic biological treatment step.

17. The method of claim 16 wherein the amount of biologically treated waste water recycled from the aerobic biological treatment step to the anoxic biological treatment step is adjusted to maintain a predetermined effluent nitrate concentration and the anoxic biological treatment step is maintained at a pH range of from 6.0 to 9.0.

18. The method of claim 16 wherein the amount of biologically treated waste water recycled from the aerobic biological treatment step to the anoxic biological treatment step is adjusted to maintain a predetermined effluent nitrate concentration and the anoxic biological treatment step is maintained at a pH range of from 6.5 to 8.5.

19. The method of claim 16 wherein the purge water comprises acetic acid that provides sufficient carbon for cellular growth of microorganisms and for the reduction of nitrate to N2 in the anoxic biological treatment step.

20. The method of claim 12 wherein the hot syngas stream comprises HCN and wherein at least a portion of the treated syngas stream effluent passes to a HCN scrubber for contact with a HCN scrubbing water stream and at least a portion of a HCN scrubbing water effluent passes to the anoxic biological treatment step in the biological treatment zone that converts the HCN to compounds that are benign to microorganisms in the aerobic biological treatment step.

21. The method of claim 12 wherein at least a portion of the particulates in the scrubber waste water effluent are removed before passing the scrubber waste water effluent to the biological treatment zone.

22. The method of claim 12 wherein at least a portion of the biologically treated waste water effluent stream passes to the HCN scrubber for contact with the HCN scrubbing water stream.

23. A method of treating a hot syngas stream for conversion to chemical products by removing particulates, ammonia, COS and HCN from the hot syngas stream comprising the steps of:

passing the hot syngas stream to a scrubber;
  adding an acidic solution comprising acetic acid and water to a circulating scrubber water and maintaining the pH of the scrubber water at a pH of less than 8.0;
  capturing ammonia, COS and particulates in the circulating scrubber water and condensing water from the hot syngas stream into the circulating scrubber water;
  withdrawing a scrubber waste water effluent from the scrubber comprising absorbed COS, ammonia, ammonium and particulates from the scrubber;
  withdrawing a treated syngas stream effluent from the scrubber comprising HCN and having a reduced concentration of COS, ammonia and particulates;
  passing the treated syngas stream effluent to a HCN scrubber and contacting it therein with a HCN scrubbing water stream to capture the HCN and to produce a HCN scrubbing water effluent and a HCN scrubber syngas stream;
  passing at least a portion of the scrubber waste water effluent and the HCN scrubbing water stream to an anoxic biological treatment step for the partial conversion of nitrate formed from ammonia, and ammonium into nitrogen gas and for the at least partial conversion of COS to primarily $CO_2$ and $H_2S$, and HCN into $CO_2$ and ammonia to produce an anoxic effluent stream;
  passing at least a portion of the anoxic effluent stream to an aerobic biological treatment step for the nitrification of ammonium to nitrates;
  recovering a biologically treated waste water stream from the aerobic biological treatment step;
  passing a portion of the biologically treated waste water stream to the anoxic biological treatment step; and,
  passing a portion of the biologically treated waste water stream to the HCN scrubber as at least part of the HCN scrubbing water stream.

24. The method of claim 23 wherein the pH of the scrubber water is at a pH less than 7.5.

25. The method of claim 23 wherein at least a portion of the particulates in the scrubber waste water effluent are removed before passing the scrubber waste water effluent to a biological treatment zone.

26. The method of claim 23 wherein at least a portion of the HCN scrubbing water effluent passes to a HCN removal system wherein at least a portion of the HCN is removed to a produce a HCN removal system effluent and at least a portion of the HCN removal system effluent passes back into the HCN scrubber.

27. The method of claim 23 wherein at least a portion of a HCN treated syngas stream effluent passes to a fermentation system for the conversion of syngas to chemical products such as ethanol and other liquid products by contact with anaerobic microorganisms in an aqueous fermentation broth and the acidic scrubbing solution comprises at least a portion of the aqueous fermentation broth.

\* \* \* \* \*